Figure 3:
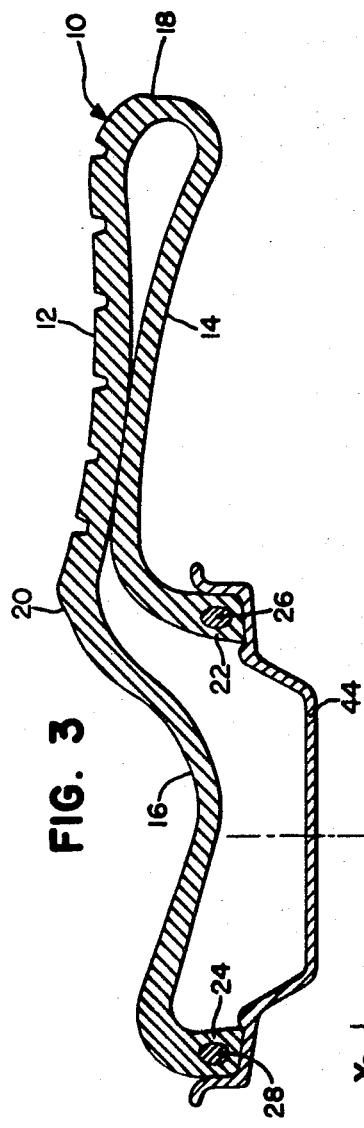

United States Patent [19]
Watts

[11] 3,833,042
[45] Sept. 3, 1974

[54] PNEUMATIC TIRE
[75] Inventor: George Timothy Watts, North Canton, Ohio
[73] Assignee: The Goodyear Tire & Rubber Company, Akron, Ohio
[22] Filed: Dec. 20, 1972
[21] Appl. No.: 316,800

Related U.S. Application Data
[63] Continuation-in-part of Ser. No. 166,049, July 26, 1971, abandoned.

[52] U.S. Cl. ................................ 152/353, 152/330
[51] Int. Cl. ............................................. B60c 3/00
[58] Field of Search .................... 152/352, 353, 330

[56] References Cited
UNITED STATES PATENTS
| | | | |
|---|---|---|---|
| 3,347,301 | 10/1967 | Sidles | 152/352 |
| 3,421,566 | 1/1969 | Sidles et al. | 152/352 A |
| 3,610,310 | 10/1971 | Wittneben | 152/352 A |

*Primary Examiner*—M. Henson Wood, Jr.
*Assistant Examiner*—Robert Saifer
*Attorney, Agent, or Firm*—F. W. Brunner; M.L. Gill

[57] ABSTRACT

A pneumatic tire having sidewalls which are foldable to a position beneath the tread and, when in the configuration in which it was cured, having a cross-sectional configuration characterized by the sidewalls being generally cylindrical and having a first diameter intermediate the edges of the tread and the beads which is less than the maximum diameter of a second region located between the region of said first diameter and the beads. The maximum diameter of the second region is greater than the inside diameter of the tread portion minus twice the sidewall thickness and a smooth convex curve connects the maximum diameter point of each second region with the axially outer side of each bead region.

The foregoing abstract is not to be taken as limiting the invention of this application, and in order to understand the full nature and extent of the technical disclosure of this application, reference must be made to the accompanying drawings and the following detailed description.

14 Claims, 5 Drawing Figures

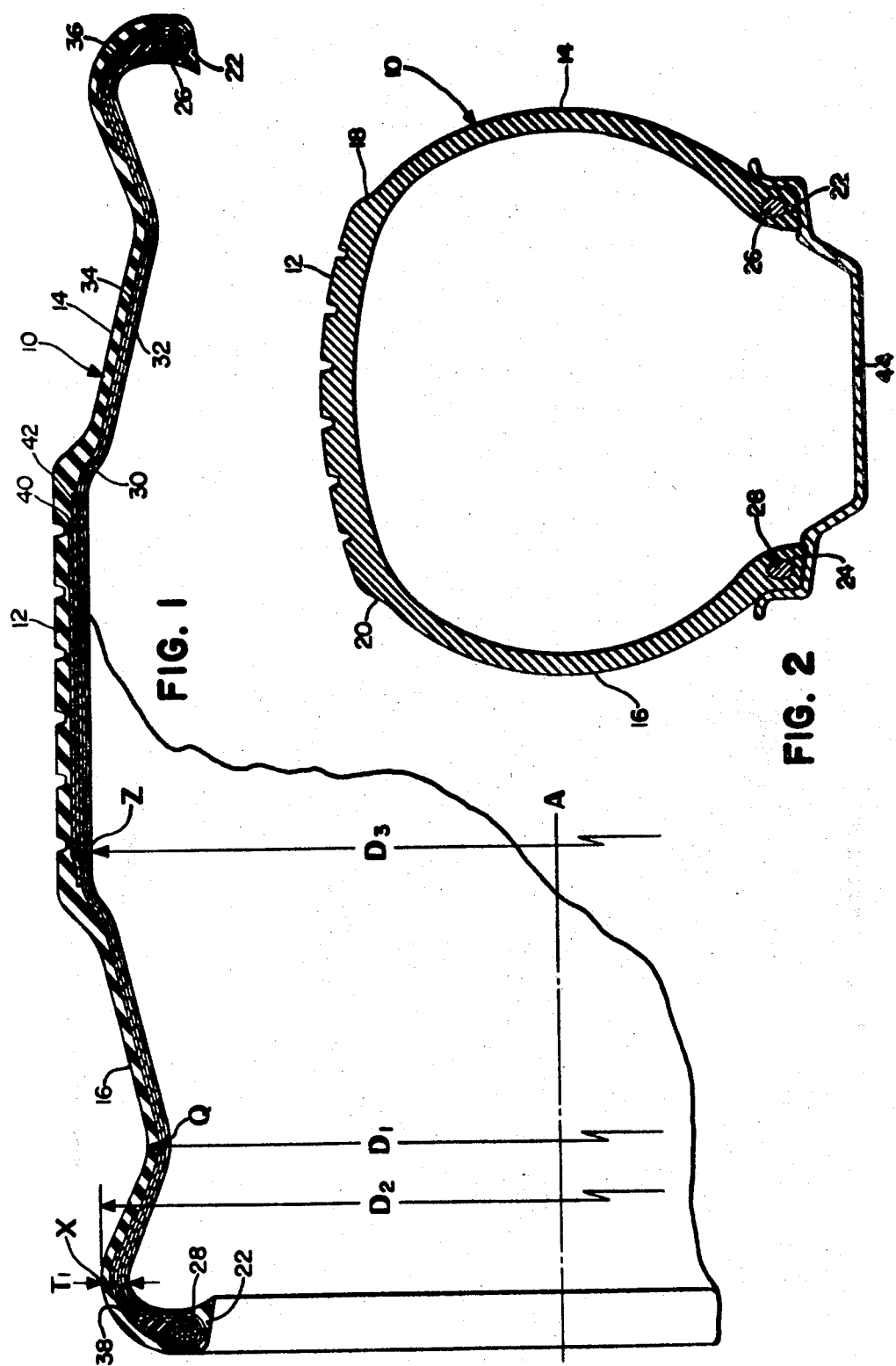

PNEUMATIC TIRE

This is a continuation-in-part of co-pending application Ser. No. 166,049 filed July 26, 1971, now abandoned.

This invention relates generally to pneumatic tires, and more particularly to a novel improved foldable pneumatic tire and a novel and improved method of manufacturing the same.

Due to space limitations in the trunk of certain passenger cars it has become desirable, if not necessary, to devise some means for reducing the space required to store a spare tire in the trunk of a vehicle. Examples of suggested ways of providing a tire having substantially reduced dimensions when deflated are shown in U.S. Pat. Nos. 3,347,300, 3,347,301, and 3,540,510.

It is an object of this invention to provide a pneumatic tire, which when mounted on a rim and in its deflated condition will have an outer diameter and crossectional width which are at most not substantially greater than the maximum diameter and axial dimensions of the rim, which can be built by the flat band method of tire building utilizing conventional tire building machines normally associated with conventional bias ply carcasses, which will not require the molding of the tire with its sidewalls folded under the tread yet which can retain the aforementioned reduced dimensions when not mounted on a rim, and particularly which is easy to fold and exhibits increased strength and durability in the bead regions.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 4:
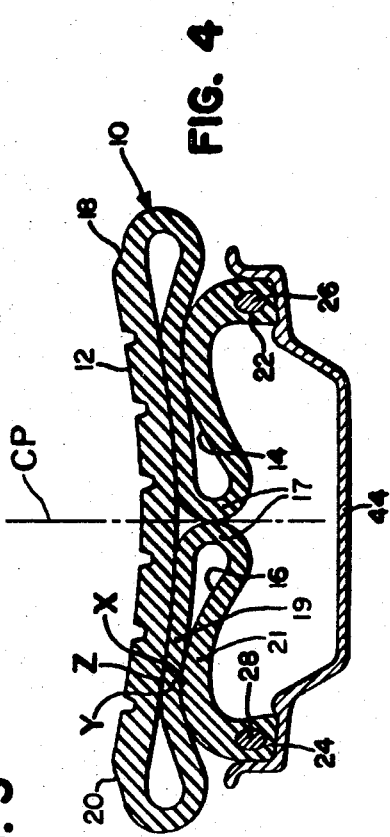
Figure 5:
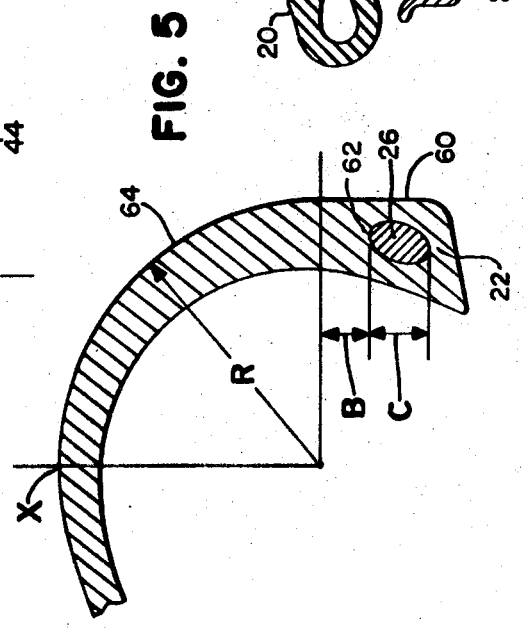

In the drawings:

FIG. 1 is a fragmentary cross-sectional view of a tire constructed in accordance with this invention and illustrated in the configuration of which it was cured, FIG. 2 is a cross-sectional view of the tire of FIG. 1 when mounted on a rim and inflated, FIG. 3 is a cross-sectional view of the tire of FIG. 1 when mounted on a rim and deflated, FIG. 4 is a cross-sectional view of the tire of FIG. 1 when mounted on a rim, deflated and folded, and FIG. 5 is a cross-sectional view of the bead and lower sidewall area of the tire in FIG. 1.

With reference to the drawings and in particular FIGS. 1 and 2, a tire 10 constructed in accordance with this invention includes an annular tread portion 12, a pair of sidewall portions 14 and 16 extending from the lateral edges 18 and 20 of the tread 12 and terminating in a pair of bead portions 22 and 24. Each bead portion 22 and 24 contains an inextensible bead 26, 28. The tire 10 when in the configuration in which it was cured (FIG. 1) is generally cylindrical or drum-like having the bead portions 22 and 24 spaced apart a substantial distance greater than the bead portion 22 and 24 when the tire is mounted on a rim and inflated (FIG. 2). The axial distance between the corresponding points in the bead regions when the tire is in the configuration in which it was cured is at least twice as great as the distance between the corresponding points when the tire is mounted on a rim. Also, the diameter of the annular tread region 12, when the tire is in the configuration in which it was cured (FIG. 1), is substantially less than the diameter of the tread region 12 when the tire is mounted on a rim and inflated (FIG. 2).

The tire 10 includes a carcass 30 having a pair of bias piles 32 and 34 extending circumferentially about the tire and having its axially outer ends 36 and 38 wrapped about their respectively associated bead core 22 or 24. The carcass 30 in the particular embodiment illustrated also includes a pair of belts or breaker plies 40 and 42 extending circumferentially about the tire and terminating in axial directions generally in the area of the edges 18 and 20 of the tread 12. The tire 10 may also include additional conventional elements such as an air impervious liner, chaffers, sidewall plies, etc., depending upon the particular manufacturer's desires. The carcass and belt material and cord angle dispositions are dependent upon the desired characteristics of the tire and are to be determined by the tire engineer. Such details have been fully described in the past, such as in U.S. Pat. No. 3,540,510 mentioned above. Further, it will be readily appreciated by those skilled in the art that this tire can be provided with whatever tread pattern is desired.

With reference to FIGS. 1 through 4, a tire constructed in accordance with this invention, when completely cured, is a generally cylindrical configuration (FIG. 1). The tire can then be mounted on a rim 44 and inflated to a generally toroidal configuration. Upon deflation of the tire when mounted on a rim 44 the tread portion 12 will normally be displaced axially of the rim, and with respect to the rest of the tire (FIG. 3). A small axial force on the axially outer end of the deflated tire will cause the tread portion 12 to move axially toward and over the rim 44 and the sidewalls 14 and 16 to fold beneath the tread 12 (FIG. 4).

More particularly and with reference to FIG. 1, the tire constructed in accordance with this invention when in the configuration in which it was cured has in the sidewall portion 14 or 16 thereof a radial depression Q disposed approximately midway between each lateral edge 18 or 20 of the tread and the respectively associated bead core 26 or 28 and having a first outer diameter $D_1$. Also included in the sidewall portion 14 or 16 is a radially raised second part X disposed intermediate the first part Q and the respectively associated bead core 26 or 28 and having a maximum outside diameter $D_2$. The first outside diameter $D_1$ of the part Q is less than the maximum outside diameter $D_2$ of the part X by an amount equal to at least the thickness $T_1$ of the part X at the maximum diameter point.

As seen in FIG. 4, each part Q, being disposed approximately midway between the lateral edge 18 or 20 of the tread 12 and its respectively associated bead core 26 or 28, forms the folded portion 17 located closely adjacent the mid-circumferential centerplane CP of the tire when the tire is mounted on a rim and folded. The sidewalls are thus contained substantially beneath the tread portion 12 with each sidewall forming first and second substantially axially extending portions 19 and 21, the first portion 19 being disposed coaxially about the second portion 21. Further, the inside diameter $D_3$ of the tread portion 12, when in the configuration in which it was cured, is sufficiently small such that it stretches tightly about the axially extending portions 19 and 21 of the respective sidewall when the tire 10 is on a rim and folded.

With reference to FIG. 5 and also in accordance with this invention, the lower sidewall portion of the tire including the bead portion 22 or 24 and the portion of the sidewall immediately adjacent thereto is provided with a novel outside surface contour when in the configuration in which it was cured. The axially outer surface 60 is substantially flat and normal to the rotational axis of the tire. The substantially flat surface 60 further extends radially outwardly beyond the radially outer extremity 62 of the respectively associated bead core 26 or 28 by an amount equal to no more than the radial height C of the bead core 26 or 28. The outer surface of the lower sidewall portion adjacent the bead portion 22 or 24 is smoothly convex and has a radius of approximately 1 inch. The center of curvature of the smoothly convex portion 64 is located radially outwardly with respect to the radially outer extremity of the bead core 26 or 28 by a distance B equal to no more than the radial height C of the bead core 26 or 28. Preferably the radius of curvature of the portion 64 is no less than three-quarters of an inch. The smoothly convex surface 64 merges with both the flat surface 60 and the maximum diameter region X of the sidewall.

This novel outside surface configuration of the lower sidewall and bead region of the tire, when in the configuration in which it was cured, prevents the application of excessive torque on the bead core 26 or 28 in a direction around the bead core 26 or 28 when the tire is mounted on a rim and inflated. This is accomplished by providing a bead portion in the area of the sidewall immediately adjacent the bead portion substantially in the configuration in which it takes when it is inflated.

While certain representative embodiments and details have been shown for the purpose of illustrating the invention, it will be apparent to those skilled in this art that various changes and modifications may be made therein without departing from the spirit or scope of the invention.

What is claimed is:

1. In a foldable pneumatic tire having a central generally annular tread and a pair of sidewalls extending respectively from the opposite edges of said tread and terminating in inextensible beads, said sidewalls being foldable axially inwardly toward each other so as to be contained substantially beneath the tread, the improvement comprising; when said tire is in the configuration in which it was cured each sidewall having a first region located axially outwardly of said tread and intermediate said edges and its respectively associated bead said first region having a smaller outside diameter with respect to the rotational axis of the tire than a second region intermediate said first region and its respectively associated bead.

2. In a tire as claimed in claim 1, the minimum diameter point in each said first region being located about midway between the respective edge of the tread and the respective bead such that when said tire is mounted on a rim and folded, said minimum diameter point becomes a fold disposed closely adjacent the mid-circumferential centerplane of the tire.

3. In a tire as claimed in claim 1, when said tire is in the configuration in which it was cured, the external surface of said tire adjacent each bead comprises a substantially flat surface axially outwardly of each bead which extends radially outwardly beyond its respectively associated bead and merges into a smooth convex surface having a radius of curvature of at least three-quarters of an inch, said smooth convex surface connecting said flat surface to the point of maximum diameter in said second region.

4. In a tire as claimed in claim 3 said beads being spaced apart axially, when said tire is in the configuration in which it was cured, a distance equal to at least twice the axial spacing between said beads when the tire is mounted on a rim.

5. In a tire as claimed in claim 4, the minimum diameter point in each said first region being located about midway between the respective edge of the tread and the respective bead such that when the said tire is mounted on a rim and folded, said minimum diameter point becomes a fold disposed closely adjacent the mid-circumferential centerplane of the tire.

6. In a tire as claimed in claim 5, the outside diameter of said first region is being less than the maximum outside diameter of said second region by an amount equal to at least the thickness of the sidewall at said maximum outside diameter.

7. In a tire as claimed in claim 6, the minimum radius of curvature of said smooth convex surface being about one inch and having its center of curvature disposed radially outwardly with respect to the bead a distance equal to no more than the radial height of said bead with respect to the rotational axis of the tire.

8. In a tire as claimed in claim 1, the outside diameter of said first region being less than the maximum outside diameter of said second region by an amount equal to at least the thickness of the sidewall at said maximum outside diameter.

9. In a foldable pneumatic tire having a central generally annular tread and a pair of sidewalls extending respectively from the opposite edges of said tread and terminating in the inextensible beads, said sidewalls being foldable axially inwardly toward each other so as to be contained substantially beneath said tread, the improvement comprising; when said tire is in the configuration in which it was cured said sidewall extending axially outwardly of said tread the external surface of said tire adjacent each bead being defined by a substantially flat surface disposed axially outwardly of each bead and extending radially outwardly beyond its respectively associated bead and a smooth convex surface having a radius of curvature of at least three-quarters of an inch extending radially outwardly from said flat surface to a maximum diameter point in the sidewall with the center of curvature of said radius being disposed radially outwardly of its respectively associated bead.

10. In a tire as claimed in claim 9, each said sidewall having a first region disposed intermediate said edges and its respectively associated bead, which has a smaller outside diameter with respect to the rotational axis of the tire than said maximum diameter point, said maximum diameter point being disposed in a second region intermediate said first region and the respectively associated bead.

11. In a tire as claimed in claim 10, the minimum diameter point in each said first region being located about midway between the respective edge of the tread and the respective bead such that when said tire is mounted on a rim and folded, said minimum diameter point becomes a fold disposed closely adjacent the mid-circumferential centerplane of the tire.

12. In a tire as claimed in claim 11, the outside diameter of said first region being less than the maximum outside diameter of said second region by an amount equal to at least the thickness of the sidewall at said maximum outside diameter.

13. In a tire as claimed in claim 12, the radius of curvature of said convex surface being about 1 inch.

14. In a tire as claimed in claim 10, the radius of curvature of said convex surface being about 1 inch.

* * * * *